United States Patent [19]

Kraus

[11] Patent Number: 5,046,223
[45] Date of Patent: Sep. 10, 1991

[54] HOLDING ELEMENT OF PLASTIC

[75] Inventor: Willibald Kraus, Grünstadt, Fed. Rep. of Germany

[73] Assignee: TRW United Carr GmbH & Co., Enkenbach-Alsenborn, Fed. Rep. of Germany

[21] Appl. No.: 437,168

[22] Filed: Nov. 16, 1989

[30] Foreign Application Priority Data

Oct. 5, 1989 [DE] Fed. Rep. of Germany ... 8911881[U]

[51] Int. Cl.$^5$ .................. A44B 21/00; F16B 19/00
[52] U.S. Cl. .................................. 24/453; 24/297; 411/508
[58] Field of Search .............. 24/453, 297; 411/508, 411/509, 510, 913

[56] References Cited

U.S. PATENT DOCUMENTS

| | | | |
|---|---|---|---|
| 3,080,629 | 3/1963 | Meyer | 24/297 |
| 3,213,500 | 11/1963 | Thompson . | |
| 3,230,592 | 1/1966 | Hosea | 24/297 |
| 3,412,437 | 11/1968 | Bennett . | |
| 3,449,799 | 6/1969 | Bien | 411/913 |
| 3,476,008 | 11/1969 | Pearson et al. | 411/508 |
| 3,678,797 | 7/1972 | Seckerson . | |
| 3,909,883 | 10/1975 | Fegen . | |
| 4,604,776 | 8/1986 | Takahashi | 411/913 |

FOREIGN PATENT DOCUMENTS 2426179 12/1979 France .
1217206 12/1970 United Kingdom .................. 24/297

Primary Examiner—Victor N. Sakran
Attorney, Agent, or Firm—Fay, Sharpe, Beall, Fagan, Minnich & McKee

[57] ABSTRACT

A holding element fastener formed of molded plastic for fastening within a support opening and having a base body and two resilient fingers for extending through the support opening. The fingers stand at an acute angle to each other, and when in the mounted condition grip behind the support opening. The base body and the resilient fingers define an approximately V-shape triangular inter-space and each of the resilient fingers is provided on its outer circumference with two inwardly extending open areas which reduce the total amount of plastic required and simplify the operation of molding the holding element fastener. The open areas are located on opposite sides of a laterally extending middle stay in the form of a relatively thin rib. The upper limit of each middle stay is defined by a separate transverse outwardly extending cross stay which joints to the upper end of the respective resilient finger and the associated middle stay.

3 Claims, 1 Drawing Sheet

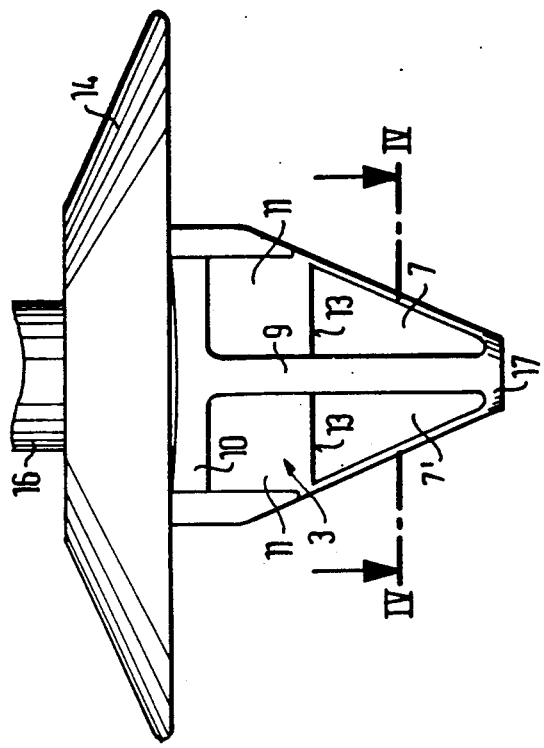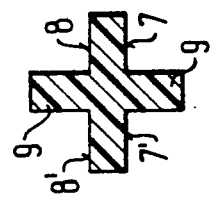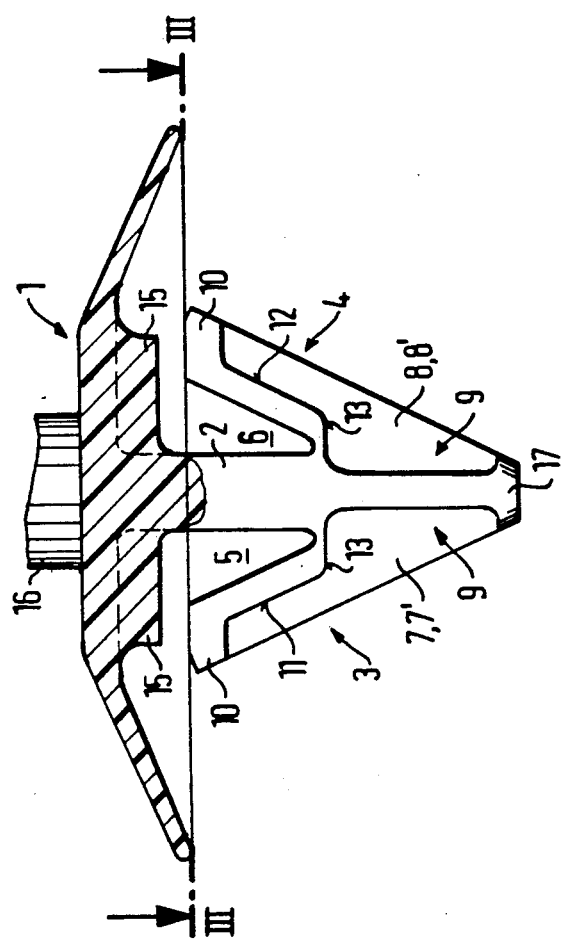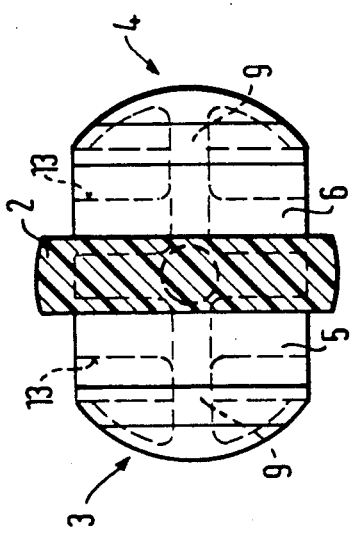

HOLDING ELEMENT OF PLASTIC

BACKGROUND OF THE INVENTION

The subject invention relates to a plastic holding element for fastening inside a support opening. The element includes a base body and two oppositely disposed resilient fingers arranged thereon for extending through the support opening at an acute angle with each other. In the installed condition, the fingers grip behind the support opening. In each case, the base body and the resilient fingers define an approximately triangular interspace.

Such holding elements are already broadly known in the prior art wherein to a base body are connected two resilient fingers which lie opposite each other. Typically, another element is present at a location above a sealing lip (see U.S. Pat. Nos. 3,909,883 and 3,678,797). It is a disadvantage in these known constructions that their design results in a thick accumulation of the plastic material in the zone of the resilient fingers. As a consequence, exact accuracy of size of these resilient fingers is not possible. Moreover, the thick accumulation of the plastic material results in an undesired shrinking of material during cooling after the molding process. As a consequence, during production a slow injection of plastic is necessary. Also, in the final product, a constant checking of quality is necessary.

Also in the prior art are other holding elements with rectangles at right angles to each other instead of the resilient fingers (see U.S. Pat. No. 3,412,437, and French Patent 2,426,179). Also known is the arrangement of a slot between the resilient fingers (see U.S. Pat. No. 3,213,500). These known constructions also do not meet the requirement of accuracy of measurement because of their special shaping.

The present invention addresses the problem of designing a holding element of the kind mentioned so that, in a simple manner, a large or thick accumulation of material does not result and in production a constant good quality of finished product is assured.

BRIEF STATEMENT OF THE INVENTION

This problem is solved, according to the invention, by the fact that the resilient fingers are provided on their outer circumference with open areas or spaces. Through these open areas, the advantages are given of more rapid injection times, a prevention of deformation by later shrinkage, an exact accuracy of measurement, a prevention of internal cavities, and a saving of material, as well as a better or easier mounting in a support opening.

In a further development of the invention, each resilient finger may have a middle stay, to which the open area or space adjoins on both sides. Here, the middle stay is limited in the upper zone by a cross stay. Moreover, the resilient fingers have, in the zone of the triangular interspace, a surface parallel to one side of the triangle, while in each case the two surfaces of the resilient fingers stand at an equal angle with the base body. The surfaces are limited in the upper zone by the cross stay, and in the lower zone by a step of graduation divided by the middle stay. In the front zone, the resilient fingers may run in a wedge form defined with four rectangles at right angles to each other in cross section, formed by the middle stays and the open areas.

In a further development of the invention, the base body is designed rectangular in cross section and may be joined by a circumferential sealing lip which lies opposite the resilient fingers. On the under side of the base body parallel to the middle stays is arranged a stay extending up to the base body. This stay may be wider than the two middle stays of the resilient fingers.

BRIEF DESCRIPTION OF THE DRAWINGS

The invention will be described in detail below, with reference to the example of execution represented in the drawing, wherein:

FIG. 1 is a side view, partially in section, of a holding element formed in accordance with the preferred embodiment;

FIG. 2 is a front view of the holding element of FIG. 1;

FIG. 3 cross section taken along line III—III of FIG. 1; an

FIG. 4 a cross section taken along line IV—IV of FIG. 2.

DETAILED DESCRIPTION OF THE DRAWINGS

Referring more particularly to the drawings wherein the showings are for the purpose of illustrating a preferred embodiment only, and not for the purpose of limiting same, FIGS. 1 and 2 show the holding element as comprising essentially a plastic base body 2 having a surrounding sealing lip 14 joined thereto in the upper zone, as well as resilient fingers 3 and 4 joined in the lower zone beneath the lip 14. The resilient fingers 3 and 4, as well as the base body 2, delimit in the inner zone an approximately triangular intermediate space 5 and 6 so that the resilient fingers are correspondingly given their elasticity and are free to deflect inward toward the base body 2.

The resilient fingers 3 and 4 are provided on their outer circumference with open areas or recesses 7, 7' and 8, 8', respectively. Each resilient finger 3, 4, has a middle stay 9, on both sides of which the open areas 7, 7' and 8, 8', adjoin. In the upper zone, the middle stay 9 passes, in each case, into a cross stay 10 which can catch behind the edge of a support opening.

The resilient fingers 3, 4 have, in each case, in the zone of the triangular intermediate space, 5, 6, a surface 11 and 12, respectively, parallel to one side of the triangle. These two surfaces 11 and 12, of the resilient fingers 3, 4, stand in each case at the same angle with the base body 2. As shown in FIGS. 1, 2 and 3, the surfaces 11, 12 are limited in the upper zone by the cross stay 10, and in the lower zone by a stepped or graduated portion 13, divided by a middle stay 9.

From FIGS. 1, 2 and 4 it can be seen that the resilient fingers 3, 4 on the front side, rise up in a wedge form configuration defined by four rectangles (in cross section) located at right angles to each other. The rectangular cross sections are formed by the middle stays 9 and the free or open spaces 7, 7' and 8, 8'. In the lower zone, these rectangles run out into a nose piece 17.

As shown in FIG. 1, surrounding elastic sealing lip 14 is arranged on the base body 2 and lies opposite the resilient fingers 3, 4. A stay 15 is formed on the under side of lip 14 and on the under side extends parallel to the middle stay 9 to the base body 2. This stay 15 has the function of guiding the fastener within a support opening during installation of the fastener. Above the surrounding sealing lip 14, the holding element according to the invention is provided with a closing element 16, for example, a pipe holding, a closing pin or another element for the holding of an object (not shown in detail).

Through the special shaping of the resilient fingers 3 and 4, with their open areas 7, 7' and 8, 8', respectively, an undesired accumulation of material is prevented, so that, besides a saving of material, there is given a more rapid injection time, and a greater accuracy and control of tolerances. This results in improved quality in the finished product. Cavities are prevented, and because the front or lead-in parts of the resilient fingers are designed with a cross shape and associated open areas, are a rapid and easy mounting in a support opening is assured.

What is claimed is:

1. A holding element fastener formed of molded plastic for fastening within a support opening and having a base body and two resilient fingers arranged thereon lying opposite each other for extending through the support opening, said fingers standing at an acute angle to each other, and when in the mounted condition gripping behind said support opening, the base body and the resilient fingers, defining an approximately V-shape open triangular inter-space, each of the resilient fingers (3, 4) are provided on their outer circumference with two inwardly extending open areas which reduce the total amount of plastic required and simplify the molding operation of said holding element fastener, said open area (7, 7'; 8, 8'') located on opposite sides of laterally extending middle stay in the form of a relatively thin rib, the middle stay of each resilient finger extending outwardly from the middle of the respective finger and being aligned with the middle stay of the other resilient finger, the upper limit of each middle stay being defined by a separate transverse outwardly extending cross stay which joins to the upper end of the respective resilient finger and the associated middle stay.

2. The holding elements according to claim 1 wherein the resilient fingers (3, 4), define open triangular inter-spaces (5, 6), and wherein each finger has a surface (11, 12) parallel to one side of the triangular inter-space with the two surfaces (11, 12) of the resilient fingers (3, 4) lying at the same angle with the base body (2).

3. The holding element according to claim 1 wherein the resilient fingers (3, 4) run up on their front side, in wedge form with four rectangles in cross section positioned at right angles to each other and formed by the middle stay (9) and the open areas (7, 7', 18, 8').

* * * * *